Figure 1:
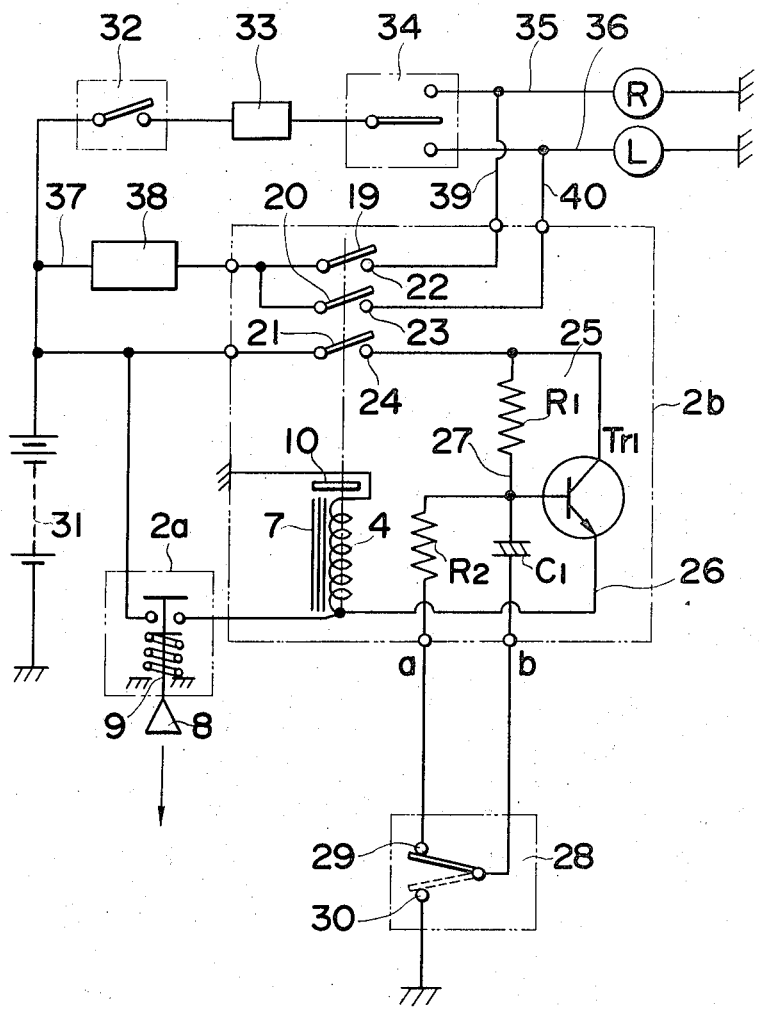

United States Patent [19]
Suzuki

[11] 3,832,680
[45] Aug. 27, 1974

[54] HAZARD WARNING SIGNAL DEVICE FOR USE IN AUTOMOTIVE VEHICLE

[75] Inventor: Masaru Suzuki, Aichi, Japan

[73] Assignee: Kabushiki Kaisha Tokai Rika Denki Seisakusho, Aichi-ken, Japan

[22] Filed: Nov. 29, 1971

[21] Appl. No.: 202,972

[30] Foreign Application Priority Data
Nov. 28, 1970 Japan.............................. 45-104996

[52] U.S. Cl..................... 340/56, 340/81 R, 315/77
[51] Int. Cl............................................... B60q 1/26
[58] Field of Search............ 340/54, 55, 56, 66, 67, 340/73, 81 F, 81; 315/77

[56] References Cited
UNITED STATES PATENTS

| | | | |
|---|---|---|---|
| 2,106,643 | 1/1938 | Mellen et al.......................... | 340/54 |
| 2,704,360 | 3/1955 | Werstein............................... | 340/56 |
| 3,304,381 | 2/1967 | McAnespey ................... | 340/71 UX |
| 3,316,533 | 4/1967 | Kell....................................... | 340/56 |
| 3,462,733 | 8/1969 | Boya et al............................. | 340/54 |
| 3,500,315 | 3/1970 | Shimada ........................... | 340/67 X |
| 3,555,506 | 1/1971 | Daws .................................... | 340/56 |
| 3,557,328 | 1/1971 | Winogrocki et al. ........ | 340/81 F UX |
| 3,576,530 | 4/1971 | Buechler........................ | 340/67 UX |

*Primary Examiner*—Donald J. Yusko
*Attorney, Agent, or Firm*—Craig & Antonelli

[57] ABSTRACT

A hazard warning signal device for use in automotive vehicles including an actuator controlling at least one switch for closing directly or indirectly a load circuit for simultaneously flashing a plurality of vehicle lamps to indicate a hazardous condition, as well as closing a control circuit. The control circuit is responsive to detecting switch means detecting the starting or motion condition of the vehicle from a stopped position for releasing the at least one closing switch.

9 Claims, 6 Drawing Figures

HAZARD WARNING SIGNAL DEVICE FOR USE IN AUTOMOTIVE VEHICLE

The present invention relates to an electrical switching device and, more particularly, to a hazard warning signal device especially adapted for use in vehicle signaling systems having left-hand and right-hand indicators selectively used as direction indicators or hazard warning indicators.

Automotive vehicles conventionally in use have left-hand and right-hand indicators or lamps which may be selectively flashed to indicate a left-hand or right-hand turn, respectively. In some instances, the lamps at both sides of the vehicles may be flashed simultaneously so as to warn drivers of approaching vehicles of a potentially hazardous condition. In some vehicles the direction signaling lamps and the hazard warning lamps are the same, whereas in other vehicles the hazard warning lamps are independent of and in addition to the direction signaling lamps. In either case, it is desirable that the lamps can be operated to indicate a hazardous condition in any moment notwithstanding the condition of the vehicle, i.e., no matter how the vehicle is stopped, or running, and can be put off only when the vehicle is starting, i.e., placed in motion after being stopped.

In most vehicles there is a cam that is associated with the rotatable steering shaft or wheel in such manner as to rotate therewith for the purpose of canceling a left-hand or right-hand direction indicator signal. Such a cam can be conveniently used to cancel the hazard warning signal as well, provided the latter is constructed and arranged to cooperate with the cam. A construction of this kind is disclosed in U.S. Pat. No. 3,371,172 filed on June 29, 1966 and granted on Feb. 27, 1968.

One disadvantage inherent in such known warning signal devices is that they are incapable of proper functioning when their actuator is pushed into the canceling cam or when the canceling cam undergoes a large strain such that proper engagement with the actuator is no longer possible.

Another disadvantage inherent in such conventional warning signal devices is that their operation is canceled by the canceling cam even when the vehicle commences to stop, though it is desirable that their operation is canceled when the vehicle commences to run.

Accordingly, an essential object of the present invention is to provide an improved hazard warning signal device wherein the above mentioned disadvantages inherent in the conventional one of this kind have substantially been eliminated.

Another object of the present invention is to provide an improved hazard warning signal device wherein the hazard warning signal is canceled by the provision of electrical means such as an electro-magnet utilized in place of the mechanical cam, so that the device can be operated substantially at any time by the operator.

A further object of the present invention is to provide an improved hazard signal device wherein control means are provided to release the closure of the closing means to cancel the hazard warning signal only when the vehicle commences to run.

An essential feature of the present invention resides in a hazard warning signal device which comprises an actuator having means for returning said actuator to the original position, means for closing directly or indirectly both a load circuit for flashing lamps and control means at the same time by the operation of the actuator, means for holding the closure of the closing means operated by the actuator, switch means for detecting the running of a vehicle, electromagnet means for releasing the closure of the closing means in connection with the operation of the control means, and said control means for releasing the closure of the closing means only when the switch means detect the starting condition of the vehicle.

Figure 2:
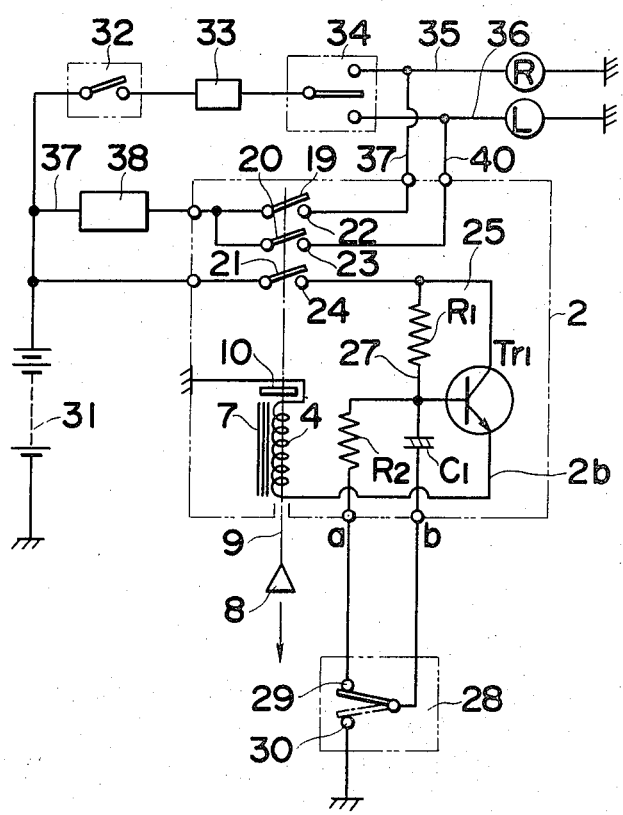
Figure 3:
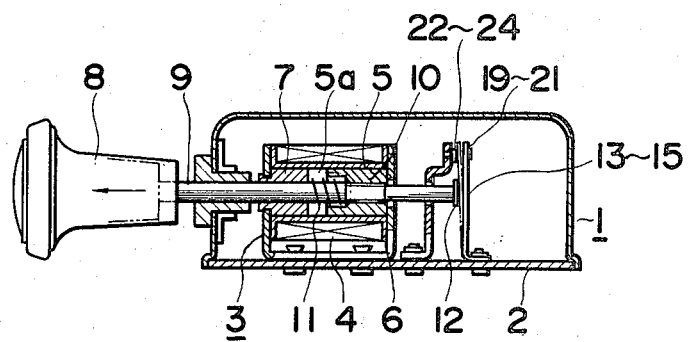
Figure 4:
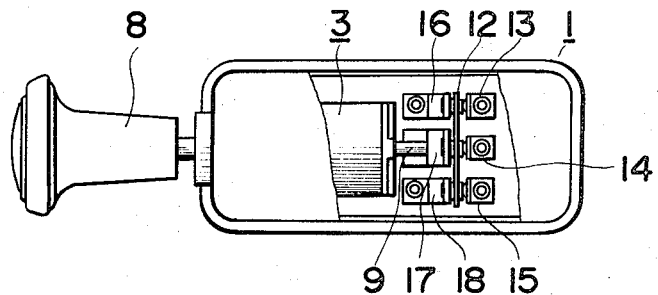
Figure 5:
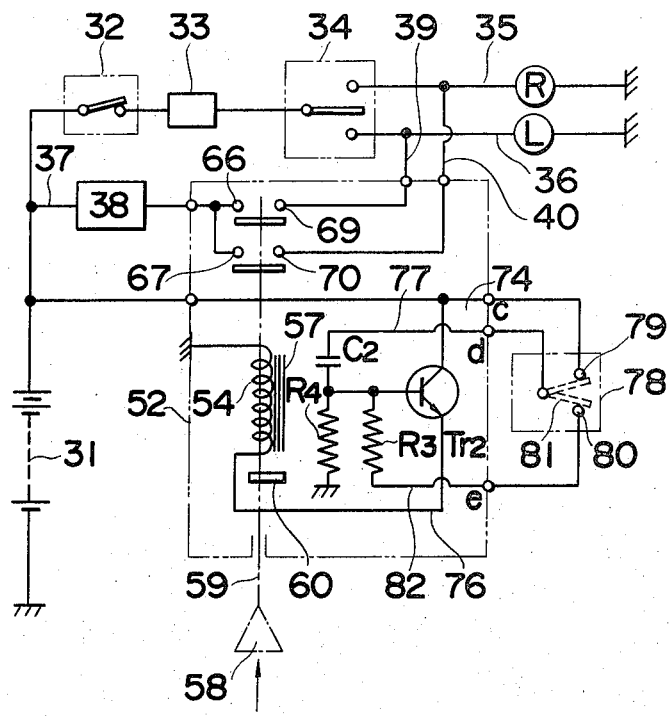
Figure 6:
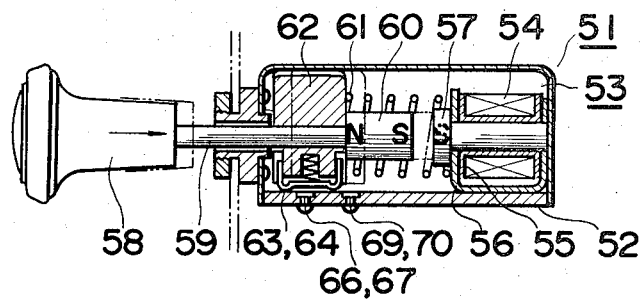

The present invention will be hereinafter fully described by way of example in conjunction with preferred embodiments thereof shown in the accompanying drawings, in which;

FIG. 1 is a schematic circuit diagram showing one preferred embodiment of a hazard warning signal device according to the present invention, FIG. 2 is a schematic circuit diagram showing another preferred embodiment of the hazard warning signal device according to the present invention, FIG. 3 is a sectional side view showing the hazard switch of FIG. 2, FIG. 4 is a plan view, a portion broken away, of FIG. 3, FIG. 5 is a schematic circuit diagram showing a further preferred embodiment of the hazard warning signal device according to the present invention, and FIG. 6 is a sectional side view showing the hazard switch of FIG. 5.

Before the description of the present invention proceeds, it is to be noted that like parts are designated by like reference numerals throughout the several views of the accompanying drawings. In addition, it is to be noted that a device constructed in accordance with the present invention is adapted for use in connection with a vehicle having a rotatable steering shaft and signaling lamps which may constitute the conventional direction signaling indicators. However, for the sake of brevity, the description of the vehicle structure is herein omitted.

Referring first to FIG. 1, a simple form of hazard warning signal device embodying the present invention is shown in schematic diagram. Considering the invention broadly, the hazard warning signal device comprises an actuator 8, switch means 2a, electromagnet means, detecting switch means 28, control means 2b and a load circuit for flashing lamps R and L. The actuator 8 includes an operating shaft 9 and a resilient member, for example, a compression spring and is operable by the operator to move between two positions as will be mentioned later. The switch means 2a includes a pair of fixed contacts and a bridge member rigidly connected with one end of said operating shaft 9 of the actuator 8, the other end of said operating shaft 9 being rigidly connected, for example, with a knob and said bridge member of said switch means 2a being adapted to engage or disengage said fixed contacts in response to the positioning of said operating shaft 9. This switch means 2a in combination with the actuator 8 functions in the same way as a commercially available push-button switch. In other words, when the actuator 8 is in a first or original position determined by the resilient member, the switch means 2a is in the off position and, when said actuator 8 is pulled to a second position against the resilient member, said bridge member of said switch means 2a shortcircuits between said fixed contacts and, therefore, said switch means 2a is in the on position. However, it is to be noted that, once the actuator 8 is released from the pulled condition, the switch means 2a can be automatically brought into the off position.

The electromagnet means includes a yoke 7, a coil 4 and a movable iron member 10 which can be attracted by said yoke 7 upon excitation of said coil 4, said iron member 10 being operatively connected with a plurality of movable switch contacts 19, 20 and 21.

The coil 4 has one end connected with a battery source 31 through the switch means 2a and the other end being grounded. The movable switch contacts 19, 20 and 21 interlocking with the iron member 10 are adapted to control the closing of the load circuit and control means 2b.

The detecting switch means 28 includes a pair of fixed contacts 29 and 30 and a movable contact and is operable in response to the vehicle driving condition in such a way that, when the vehicle is stopped or parked, the movable contact can be engaged with the fixed contact 29 and, when the vehicle is running, said movable contact can be engaged with the other fixed contact 30.

The control means 2b includes a switching transistor $Tr_1$, a discharging resistor $R_2$ and a time constant circuit comprising a capacitor $C_1$ and a resistor $R_2$, the time constant circuit being connected with the base of the transistor $Tr_1$. The collector of said transistor $Tr_1$ is connected with the battery source 31 through the contacts 21 and 24 while the emitter of said transistor is grounded through the coil 4. The capacitor $C_1$ of the time constant circuit is grounded through the contact 30 of the detecting switch means 28 while the resistor $R_2$ is connected in parallel with the capacitor $C_1$ through the contact 29.

The load circuit includes an ignition switch 32, a flasher unit 33, a direction signaling indicator switch 32, left-hand turn indicating lamps L, right-hand turn indicating lamps R and a hazard flasher unit 38, a pair of the contacts 19, 22 and 20, 23 being connected in series with the left-hand and right-hand turn indicating lamps L and R, hazard flasher unit 38 and battery source 31, and in parallel with the ignition switch 32, flasher unit 33 and direction signaling indicator switch 34. The time constant circuit is designed so as to operate for a certain period of time, for example, a few milliseconds which is shorter than during a period in which the actuator 8 is operated by the operator.

In the construction hereinabove described, the switch means operable by the actuator can operate the electromagnet means. The electromagnet means can close both the load circuit and the control means at the same time and can hold the closure of them thereafter. In addition, the control means releases the closure of the electromagnet means only when the detecting switch means detects the running condition of the vehicle.

The operation of the hazard warning signal device of the above construction will be hereinafter described.

Assuming that the operator pulls the actuator 8 to close the switch means 2a while the movable contact of the detecting switch means 28 is engaged with the fixed contact 29 in which condition the vehicle is in the stopped or parked condition, the coil 4 can be excited to magnetize the yoke 7. As the yoke 7 is magnetized, the iron member 10 can be attracted thereto to cause the movable contacts 19, 20 and 21 to contact the respective fixed contacts 22, 23 and 24. Even if the switch means 2a is readily switched off at this time, excitation of the coil 4 that has once established cannot be released by the reason as will be mentioned later so that the electromagnet means can be maintained in the self-energized condition.

Upon engagement between the movable contact 21 and the fixed contact 24 which has been effected in the manner as hereinbefore described, current flows from the power source 31 to the base of the transistor $Tr_1$ through the resistor $R_1$ and directly to the collector of said transistor $Tr_1$ whereby the transistor $Tr_1$ can be readily brought into the conductive state. Upon conduction of this transistor $Tr_1$, the coil 4 can be maintained in the excited condition without relying upon battery power fed from the battery source 31 through the switch means 2a. Since all of the movable contacts 19, 20 and 21 are adapted to contact the respective fixed contacts 22, 23 and 24 in response to the movement of the iron member 10, the closure of the contacts 21 and 24 achieved in the manner as hereinbefore described brings about the closure of each pair of the contacts 19, 22 and 20, 23 whereby the load circuit 37 can be operated to cause the turn indicating lamps R and L to operate simultaneously.

When the switch 2a is closed by pulling the actuator knob 8 to engage the movable contact 21 to the fixed contact 24, power source voltage is applied to the collector of $Tr_1$ through the contacts 21 and 24 from the battery 31, and also to the emitter or $Tr_1$ through the switch 2a from the battery 31, and no back bias is applied as the collector and the emitter of $Tr_1$ are of equal potential. Despite the fact that the collector and the emitter of $Tr_1$ are of equal potential, the coil 4 is kept energized after the switch 2a is opened because the time required for the conduction of $Tr_1$ is very short, while the time for the contacts 21 and 24 to open following the de-energization of the coil 4 by opening of the switch 2a is sufficiently longer than the above, the emitter of $Tr_1$ being grounded through the coil 4 simultaneously with the opening of the switch 2a and $Tr_1$ becomes conductive earlier than the opening of the contacts 21 and 24 such that the coil 4 is maintained in the energized condition.

If the vehicle is subsequently placed in motion while the hazard warning signal device is in the condition as hereinbefore described, the detecting switch means 28 can be operated so as to bring the movable contact to connect to the fixed contact 30. As the movable contact of the detecting switch means 28 is connected with the ground through the fixed contact 30, the base current of the transistor $Tr_1$ can flow to the ground through the switch means 28 so that said base potential can be lowered until the capacitor $C_1$ can be charged. A period of time in which the capacitor $C_1$ is charged to a saturated value depends upon the design of the time constant circuit.

During this period, in view of the fact that the base potential is lowered, the transistor $Tr_1$ can be brought into the non-conductive state thereby to release the coil 4 from the excited condition. Upon release of the coil 4, the movable contacts 19, 20 and 21 can be restored to the respective original positions so that the turn indicating lamps R and L that have been simultaneously operated can be cancelled.

On the other hand, if the actuator 8 is operated so as to close the switch means 2a while the vehicle is running or moving in which condition the movable contact of the detecting switch means 28 is engaged with the fixed contact 30, the coil 4 can be excited thereby to engage the movable contact 19, 20 and 21 to the fixed contacts 22, 23 and 24, respectively in the same manner as hereinbefore described. However, in this condition, the base current can be supplied to the transistor $Tr_1$ and concurrently the capacitor $C_1$ can be charged in a short period of time which is also determined by the design of the time constant circuit. Therefore, during this period, no base current flows to the ground through the detecting switch means 28 and, therefore, the base potential of the transistor $Tr_1$ can be increased to cause said transistor to conduct. Upon conduction of the transistor the coil 4 can be excited without relying upon the power fed through the switch means $2a$ so that said coil 4 can be maintained in the excited condition irrespective of the operation of the switch means $2a$. Thus, it is clear that the turn indicating lamps R and L can be simultaneously operated. This condition in which the turn indicating lamps R and L are simultaneously operated can be maintained even if the vehicle is subsequently stopped thereby to bring the movable contact of the switch means 28 to engage the contact 30 since no variation takes place in the base potential of the transistor $Tr_1$. In the event that the turn indicating lamps R and L that have been simultaneously operated are desired to be cancelled, what is necessary is to restart or cause the vehicle to move or re-set the detecting switch means 28.

In the following embodiment shown in FIGS. 2 through 4, the switch means $2a$ that has been provided in the foregoing embodiment shown in FIG. 1 is sustantially eliminated. Instead thereof, the operating shaft 9 is, in the instance as shown in FIGS. 2 through 4, is operatively connected with the movable iron member 10 as will be hereinafter described with reference to FIGS. 2 through 4.

Referring particularly to FIGS. 3 and 4, reference numeral 1 represents a hazard switch housing having an insulating plate 2 mounted with a magnetic frame 6 having a spool 5 wound with the coil 4. An electromagnet 3 including the yoke 7 fixedly secured to a front end of a central hole $5a$ formed in said spool 5 is also fixedly accommodated in said housing 1. Slidably extended through the center of the yoke 7 and the central hole $5a$ of the spool 5 is a non-magnetic operating shaft 9 having an outside end connected with the actuator 8. The operating shaft 9 is, at a position within the central hole $5a$, rigidly mounted with a magnetic piece, which acts as the movable iron member 10, contactable with the opposite rear end of said yoke 7, while a compression spring 11 is interposed between said magnetic piece or iron member 10 and said yoke 7. A plate member 12 made of insulating material is rigidly secured to an inside end of the operating shaft 9, said plate member 12 being normally urged by the spring 11 through the inside end of said shaft 9 toward resilient terminal members 13, 14 and 15 upwardly extending from the insulating plate 2.

Between the magnetic piece 10 and each of said resilient terminal members 13, 14 and 15, rigid terminal members 16, 17 and 18 are provided so that said terminal members 13, 14 and 15 can be associated with said rigid terminal members 16, 17 and 18, respectively. However, it is to be noted that, unless otherwise the resilient terminal members 13, 14 and 15 are rearwardly pushed by the plate member 12 by means of the spring 11 in the direction of each of said resilient terminal members 13, 14 and 15, these resilient terminal members are elastically engaged with the fixed terminal members 16, 17 and 18, respectively.

An electrical circuit used with this switch structure of FIGS. 3 and 4 is shown in FIG. 2 wherein the resilient terminal members 13, 14 and 15 and the rigid terminal members 16, 17 and 18 are respectively shown in the form of the movable contacts 19, 20 and 21 and fixed contacts 22, 23 and 24.

The arrangement of circuit of FIG. 2 is substantially the same as shown in FIG. 1 except for the switch means $2a$ is not provided in the former. Accordingly, for the sake of brevity, the details of the arrangement thereof is omitted and, instead, the operation of the embodiment shown in FIGS. 2 through 4 will be hereinafter described.

In the case where the hazard signaling operation is desired to be effected while the vehicle is stopped or parked in which condition the movable contact of the detecting switch means 28 is of course engaged with the fixed contact 29, what is necessary is to pull the actuator 8 against the spring 11. As the actuator 8 is pulled against the spring 11, the operating shaft 9 is integrally moved in the direction that the plate member 12 clears off from the resilient terminal members 13, 14 and 15 thereby to permit the latter to contact the rigid terminal members 16, 17 and 18. Especially, upon closure of the contacts 21 and 24 incident to the contact between the resilient terminal member 15 and the rigid terminal member 21, the transistor $Tr_1$ can be brought into the conductive state in the same manner as hereinbefore described with reference to FIG. 1 and, therefore, the coil 4 can be excited thereby to magnetize the yoke 7. Upon magnetization of the yoke 7, the magnetic piece 10 rigidly mounted on the operating shaft 9 can be attracted toward the yoke 7 thereby to maintain the pairs of contacts 19, 22; 20, 23; and 21, 24 in the respectively engaged positions while the coil 4 can be maintained in the self-excited condition. Thus, it is clear that the turn signaling indicator lamps R and L can be simultaneously operated. If the actuator 8 is pushed back in the urging direction of the spring 11 against the magnetic attraction exerted between the yoke 7 and the iron piece 10 while in this condition as hereinbefore described, the resilient terminal members 13, 14 and 15 can be separated away from the rigid terminal members 16, 17 and 18 by means of the plate member 12 so that no current flows to the transistor $Tr_1$ and, therefore, the operation of the turn indicating lamps R and L can be cancelled.

Of course, without pushing the actuator 8 back to the original position as hereinbefore described, the coil 4 can be released from the excited condition upon engagement of the movable contact of the detecting switch means 28 to the fixed contact 30 by the reason as hereinbefore described in connection with the foregoing preferred embodiment shown in FIG. 1, whereby the operation of the lamps R and L can be automatically cancelled.

Even in the case where the movable contact of the detecting switch means 28 is engaged with the fixed contact 30, namely, the vehicle is running or in motion, the turn indicating lamps R and L can be simultaneously operated by pulling the actuator 8 against the spring 11 and cancelled either by pushing the actuator 8 back against the magnetic attraction between the yoke 7 and the magnetic piece 10 or by stopping and then placing the vehicle in motion. This can be easily understood from the description of the operation of the embodiment shown in FIG. 1.

In FIGS. 5 and 6 is shown a further preferred embodiment of the present invention. Referring particularly to FIG. 6, reference character 51 represents a hazard switch housing having an insulating plate 52. Within this housing 51, the insulating plate 52 is mounted with a magnetic frame 56 having a spool 55 wound with a coil 54, and a yoke 57 rigidly extended through a central hole of the spool 55. These elements as indicated by 54, 55, 56 and 57 constitute an electromagnet generally indicated by 53. Slidably extended through the housing 51 is an operating shaft 59 having one end situated outside said housing and rigidly connected with an actuator 58 and the other end rigidly connected with a permanent magnet 60. This operating shaft 59 is also mounted, at a portion adjacent to the end thereof connected with the permanent magnet 60, with a contact holder 62 formed with a plurality of bridge members 63 and 64 adapted to connect between terminals 66, 69 and 67, 70 of two pairs, respectively, in response to the movement of the operating shaft 59. Disposed between the contact holder 62 and the electromagnet 53 is a compression spring 61 adapted to urge the operating shaft 59 in the direction that the permanent magnet 60 is separated away from the yoke 57, in which condition the two pairs of the contacts 66, 69 and 67, 70 are respectively opened.

In the circuit diagram shown in FIG. 5 which is used with the hazard switch structure of FIG. 6, the fixed contacts 66 and 67 are connected with each other and in turn connected with the hazard flasher unit 38 while the fixed contacts 69 and 70 are respectively connected with the turn indicating lamps L and R.

Reference numeral 78 represents a detecting switch means of the substantially same construction as that of the detecting switch means 28 shown in the foregoing two embodiment of the present invention, but shown as having a movable contact 81 connected with the base of a switching transistor $Tr_2$ through a capacitor $C_2$, a first fixed contact 79 connected with the battery source 31 and a second fixed contact 80 connected with the base of the transistor $Tr_2$ through a biasing resistor $R_3$. The base of the transistor is also connected with the ground through a resistor $R_4$, said resistor $R_4$ constituting the time constant circuit in cooperation with said capacitor $C_2$. The collector of the transistor $Tr_2$ is connected with the battery source 31 while the emitter thereof is connected with the ground through the coil 54. The detecting switch means 78 in this instance is designed such that, when the vehicle is running or moving the movable contact 81 is engaged with the contact 79 to insert the capacitor $C_2$ in the base circuit 77 and, when the vehicle is stopped or parked, said movable contact 81 is engaged with the contact 80 to complete the discharge circuit 82 for the capacitor $C_2$ and concurrently to insert the resistor $R_3$ in said discharge circuit 82.

The operation of the embodiment shown in FIGS. 5 and 6 will be hereinafter described.

So long as current from the battery source 31 is charged in the capacitor $C_2$, the charge of the capacitor $C_2$ can be discharged through the resistor $R_3$ only when the vehicle is stopped or parked in which condition the movable contact 81 of the switch means 78 is engaged with the contact 80. While in this condition, if the actuator 58 is pressed against the compression spring 61 to cause the permanent magnet 60 to contact the yoke 57 by the magnetic attraction, said yoke 57 being in the unmagnetized condition at this time. Upon magnetic engagement between the magnet 60 and the yoke 57 of the electromagnet 53, the pairs of the contacts 66, 69 and 67, 70 can be shortcircuited by the bridge members 63 and 64, respectively, thereby to bring the load circuit 37 into the operative condition so that the turn indicating lamps R and L can be simultaneously operated. It is to be noted that, at this time, since the base circuit 77 is disengaged from the battery source 31 because of the movable contact 81 cleared off from the contact 79, the electromagnet 53 remains in the inoperative position.

If the vehicle commences to run or is placed in motion while the turn indicating lamps R and L are simultaneously operated as hereinbefore described, the movable contact 81 of the detecting switch means 78 is shifted to contact the contact 79 whereby current from the battery source 31 can be permitted to flow to the base of the transistor $Tr_2$ through the switch means 78 for a certain period of time until the capacitor $C_2$ is charged, the value of said time being determined by the design of the time constant circuit. As the current from the battery source 31 flows to the base of the transistor, the latter can be brought into the conductive state whereby the coil 54 inserted between the emitter and collector of said transistor $Tr_1$ can be excited to magnetize the yoke 57 of the electromagnet 53 into the same polarity as that of the end of the permanent magnet 60 adjacent to said yoke 57. As a result thereof, a magnetic repellent force can be exerted between the end of the permanent magnet 60 and the yoke 57 so that the engagement between them can be released, causing the operating shaft 59 to return to the original position by the action of the spring 61. Upon return of the operating shaft 59 to the original position, the bridge members 63 and 64 can be also cleared off from the pairs of the contacts 66, 69 and 67, 70 whereby the operation of the turn indicating lamps R and L can be cancelled. However, it is to be noted that, upon generation of the repellent force between said magnet 60 and said yoke 57, the operating shaft 59 can be quickly returned to the original position.

On the other hand, the capacitor $C_2$ can be thereafter charged to cut off the base circuit 77 and, therefore, the coil 54 is no longer excited so that the load circuit 37 can be controlled as desired by operating the actuator 58.

In the event that the vehicle is stopped or parked while the load circuit 37 is in the operative condition, the base circuit 77 can be cut off by the switch means 78 in which condition the movable contact 81 is engaged with the contact 80. Accordingly, the coil 54 is maintained in the unexcited condition and, on the other hand, the permanent magnet 60 acts to maintain the operating shaft 59 in the shifted position against the spring 61. Therefore, the operation of the turn indicating lamps R and L can be advantageously maintained. At the same time, discharge of the capacitor $C_2$ take place and, accordingly, the operation of the lamps R and L can be cancelled upon re-start of the vehicle or manually engaging the contact 81 to the contact 79.

In this embodiment shown in FIGS. 5 and 6, it is to be noted that, irrespective of the operation of the electromagnet 53, the turn indicating lamps R and L can be easily operated or cancelled by operating the actuator 58. In other words, irrespective of the operation of the electromagnet 53, a reliable engagement between the contact 66 and 67 and the contact 69 and 70 by means of the bridge members 63 and 64, respectively, can be ensured by the provision of the permanent magnet 60. In this case, what is necessary to cancel the operation of the turn indicating lamps R and L is merely to pull the actuator in the urging direction of the spring 61 against the magnetic attraction between the permanent magnet and the yoke 57.

Although the present invention has been fully described by way of example, various changes and modifications are apparent to those skilled in the art. For example, the pair of movable attracting means 10 or 60 and fixed attracting means 3 or 53 respectively shown in the second and third preferred embodiments of FIGS. 3 and 6 may be concurrently employed in the form of electromagnets, respectively. Accordingly, unless otherwise such changes and modifications depart from the scope of the present invention, they should be construed as included in the scope of the present invention.

What is claimed is:

1. A hazard warning signal device for automobiles, comprising a battery source, a hazard flasher unit connected with said battery source, actuator means biased toward a first position and movable between the first position and a second position, first switching means having a plurality of contacts movable from an open position to a closed position in response to the movement of said actuator means from the first position to the second position independently of the operating condition of the vehicle, load circuit means having a plurality of lamps connected with said hazard flasher unit through said first switching means so as to simultaneously flash said lamps as a hazard warning indicator, control circuit means coupled to said battery source for controlling the operation of said load circuit means, second switching means connected with said control circuit means for detecting the operating condition of the vehicle, and magnetic means responsive to the movement of said actuator means for maintaining said first switch means in the closed position and being responsive to said control circuit means for releasing said first switching means from the closed position when said second switching means detects the movement of the vehicle from a stopped condition.

2. A hazard warning signal device according to claim 1, wherein said actuator means includes a switch for indirectly controlling the energization of said load circuit means and said control circuit means by controlling the closing of said first switch means.

3. A hazard warning signal device according to claim 1, wherein said load circuit means is coupled to said battery source through said first switching means, and said magnetic means is an electromagnetic means.

4. A hazard warning signal device according to claim 1, wherein said control circuit means is directly coupled to said battery source, and said magnetic means includes permanent magnet means responsive to the movement of said actuator means for maintaining said first switching means in the closed position and electromagnetic means responsive to said load circuit means for releasing said first switching means from the closed position when said second switching means detects the movement of the vehicle from a stopped condition.

5. A hazard warning signal device according to claim 3, wherein said control circuit means includes a switching transistor, a discharging resistor and a time constant circuit comprising a capacitor and a resistor, the collector of said transistor being connected with said battery source through said first switching means and the emitter of said transistor being connected to ground through a coil of said electromagnet means, the base of said transistor being connected with a fixed contact and a movable contact of said second switching means through said discharging resistor and capacitor in parallel with each other, said resistor being connected between the collector and the base.

6. A hazard warning signal device according to claim 1, wherein said lamp is connected in said load circuit means are the right and left turn indicator lamps of the vehicle.

7. A hazard warning signal device for automotive vehicles, comprising a battery source, a hazard flasher unit connected with said battery source, actuator means biased by a resilient member toward a first position and movable between the first position and a second position, first switching means having a plurality of contacts movable from an open position to a closed position in response to the movement of said actuator means from the frist position to the second position independently of the operating condition of the vehicle, load circuit means having a plurality of lamps connected with said hazard flasher unit through said first switching means so as to simultaneously flash said lamps as a hazard warning indicator, control circuit means connected with said battery source through said first switching means for controlling the operation of said load circuit means, second switching means connected with said control circuit means for detecting the operating condition of the vehicle, and electromagnetic means connected with said control circuit means for maintaining said first switching means in the closed position in response to the movement of said actuator means from a first position to the second position thereof and being responsive to said control circuit means for opening said first switching means when said second switching means detects the movement of the vehicle from a stopped condition.

8. A hazard warning signal device for automotive vehicles, comprising a battery source, a hazard flasher unit connected with said battery source, actuator means biased by a resilient member toward a first position and movable between said first position and a second position, first switching means having a plurality of contacts movable from an open position to a closed position in response to the movement of said actuator means from the first postion to the second position independently of the operating condition of the vehicle, load circuit means having a plurality of lamps connected with said hazard flashing unit through said first switching means, control circuit means directly energized by said battery source for controlling the operation of said load circuit means, second switching means connected with said control circuit means for detecting the operating condition of the vehicle, and means connected with said control circuit means including permanent magnet means for maintaining said first switching means in a closed position in response to the operation of said actuator means and electromagnetic means responsive to said control circuit means when said second switching means detects movement of the vehicle from a stopped condition for opening said first switching means.

9. A hazard warning signal device according to claim 8, wherein said permanent magnet means includes a permanent magnet and an iron core of said electromagnetic means, said electromagnetic means being energized to a plurality for repelling said permanent magnet upon movement of the vehicle from a stopped condition by said control circuit means.

* * * * *